Sept. 29, 1970     E. M. HALVORSON ET AL     3,530,617
VIBRATION DRIVEN VEHICLE
Filed July 2, 1968     2 Sheets-Sheet 1
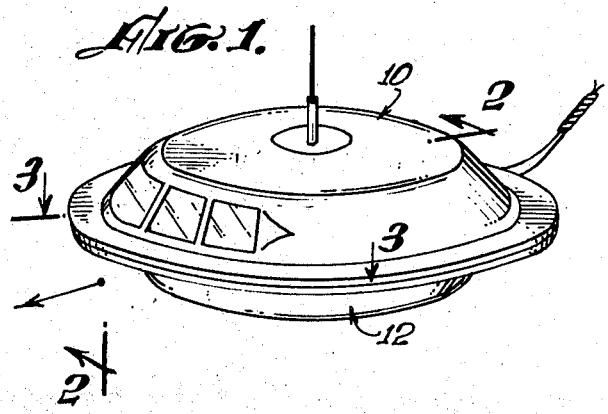
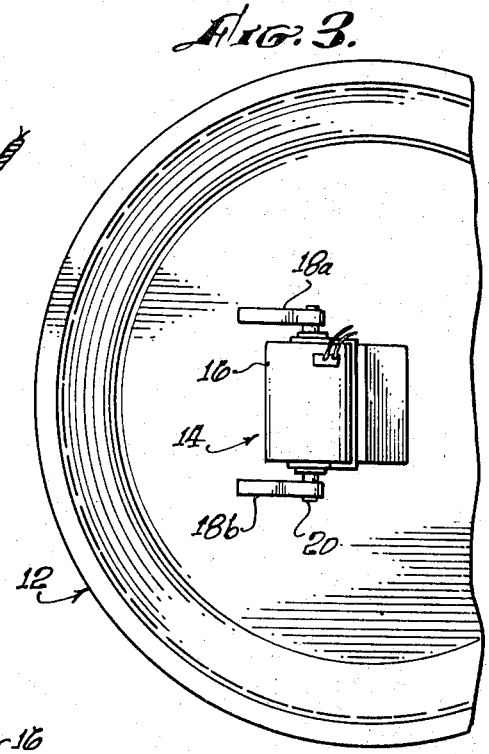
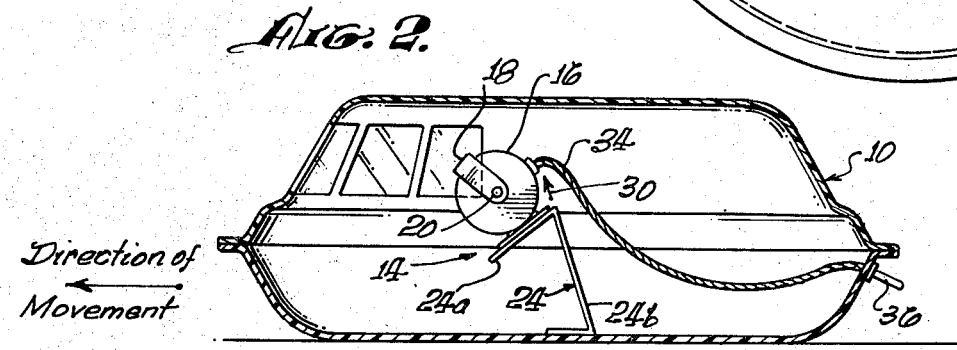
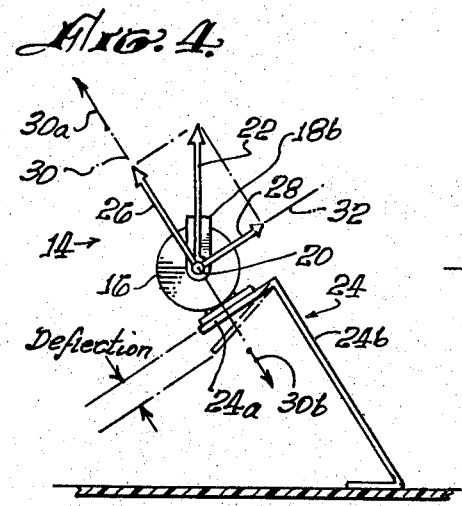
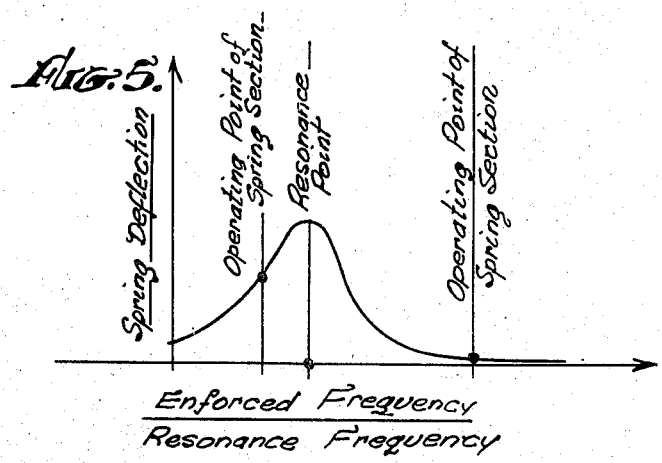
INVENTORS.
EARLE M. HALVORSON,
KURT SCHWARZ
By their Attorneys— Spensley & Horn.

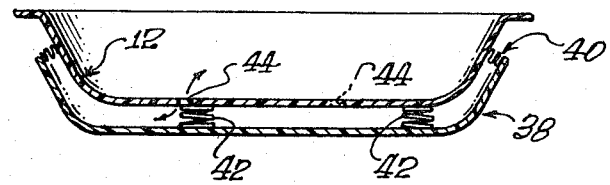
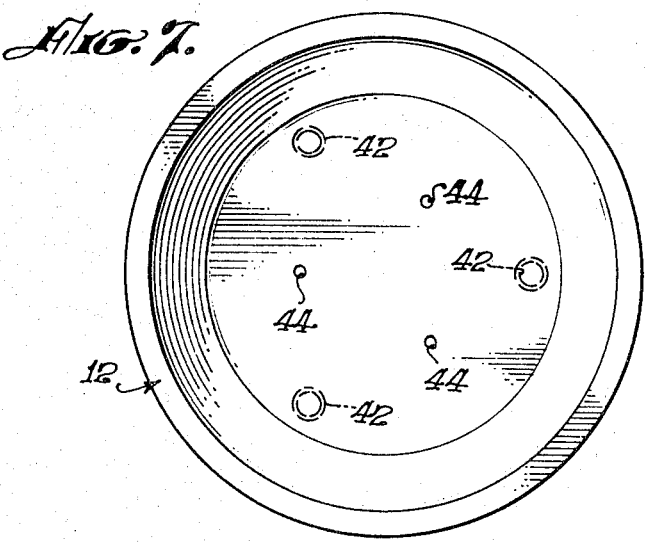
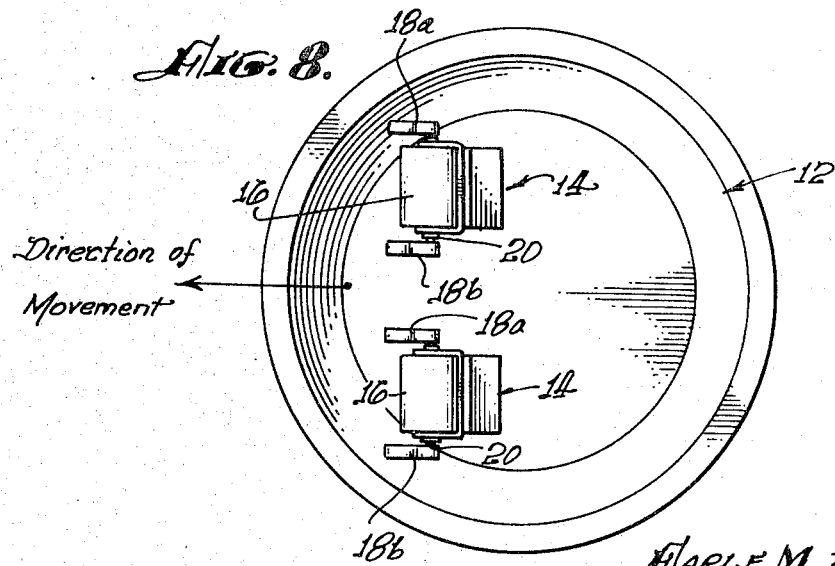

United States Patent Office 3,530,617
Patented Sept. 29, 1970

3,530,617
VIBRATION DRIVEN VEHICLE
Earle M. Halvorson, 23908 De Ville Way, Santa Monica, Calif. 90265, and Kurt Schwarz, 322 11th St., Malibu, Calif. 90402
Filed July 2, 1968, Ser. No. 742,062
Int. Cl. A63h 29/22
U.S. Cl. 46—243      17 Claims

ABSTRACT OF THE DISCLOSURE

A vibration driven vehicle, of a toy construction, having a dish-shaped structure with an electric motor mounted therein. The electric motor has rotational unbalance weights, mounted on both ends of its horizontal shaft which rotate at a predetermined speed imparting rotational centrifugal forces, acting in vertical planes thus generating vibration in a vertical plane. The motor is mounted on a unique spring which when vibrating maintains the component of the centrifugal forces only which moves the vehicle forward and eliminates the component which opposes such a movement thereby causing the vehicle to move in a horizontal direction with no visible propelling means.

BACKGROUND OF THE INVENTION

Field of the invention

This invention relates to a vibration driven vehicle which moves upon a flat surface in the horizontal direction without any visible propelling means. More particularly, this invention relates to a vehicle having therein a rotating imbalance mounted on a spring member which transforms the vibratory forces generated by the rotating imbalance into a propulsive force.

Description of the prior art

Energy storing mechanism such as enclosed spheres containing therein pendulums and springs or other driving means to make the sphere roll are well known in the art. These devices require winding up or other application of mechanical energy to store energy in a spring which, when the sphere is released, acts to roll the sphere either in the same or in the opposite direction from which the mechanical energy was originally applied. It is also well known to mount motors with unbalanced fly wheels or other devices in closed spheres or other rolling shapes to provide momentum to a rolling toy and to make it appear as they the toy is being propelled by internal means with no external application of force.

The present invention provides a mechanism for causing a dish-shaped structure having a substantially flat bottom surface to glide along a flat surface with no apparent propelling means. A rotating imbalance such as a weight on an electric motor shaft is caused to rotate thus imparting rotational centrifugal force in a vertical plane. The motor is mounted on a spring member which itself is mounted to the dish-shaped structure preferably on its floor, the spring member being caused to vibrate in such a manner responsive to the frequency of the rotating unbalance force that the vibratory forces are transformed into a propulsive force and thereby cause the dish-shaped structure to glide smoothly in a horizontal direction.

Accordingly, it is a principal object of the present invention to provide a vehicle, preferably a toy having mounted therein means for driving the vehicle in a horizontal direction without any external visible means of propulsion, such as tracks, wheels, paddles or legs.

Another object of the present invention is to provide a mechanism mounted within a dish-shaped structure whereby vibratory forces produced by a roating unbalance force are transformed into a propulsive force in the horizontal direction thus causing the dish-shaped structure to travel in the horizontal plane.

Yet another object of the invention is to provide a vehicle in the form of a dish-shaped structure having mounted therein a spring member, and to provide an electric motor having an unbalance weight mounted on its shaft attached to the spring member, such that the rotational energy of the electric motor is transformed into a horizontal propulsive force by the vibrations of the spring member.

SUMMARY OF THE INVENTION

In one of its broadest aspects, there is provided a motor driven vehicle comprising a housing having a bottom surface; spring means mounted within the housing; the spring means having at least two sections each of which have different resonance frequencies; motor means which are mounted on one section of the spring means, the motor means having a rotational imbalance and being adapted to producing a rotating centrifugal force in a vertical plane; and, the spring means being adapted to vibrate and to maintain the component of the rotating centrifugal force only which moves the vehicle in a horizontal direction and suppresses the component opposing such movement thereby causing the vehicle to move on its bottom surface in the horizontal direction.

There is thus provided a new structure as in a toy which is adapted to move in the horizontal direction on its bottom surface without any external visible propulsion means. The force provided is produced by a rotating unbalance weight mounted on a unique spring means which is adapted to vibrate and to transform the vibratory forces produced by the rotating unbalance force into a propulsive force in the horizontal direction. It is apparent that the invented mechanism is different from prior art structures in that the motor is able to propel the toy structure upon a substantially flat bottom surface in the horizontal direction as opposed to prior art devices which require a hollow sphere which can be rolled. The motor mounted within the invented structure is conveniently electrically driven and of a DC type and can therefore be supplied by internally stored dry-cell batteries or by wires leading into the housing. In either event, continuous motion can be maintained for extended periods of time. This is in contrast to prior art devices which require the frequent application of mechanical energy which is stored and then released in short spurts of movement.

The novel features which are characteristic of the invention, both as to its organization and method of operation, together with further objects and advantages thereof will be better understood from the follownig description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWINGS

FIG. 1 is a perspective of the dish-shaped vehicle structure.
FIG. 2 is a section view along line 2—2 of FIG. 1.
FIG. 3 is a view along line 3—3 of FIG. 1.
FIG. 4 is a view of the drive means with a diagrammatic representation of the rotating imbalance and force diagrams associated therewith.
FIG. 5 is a diagram showing spring deflection as a function of the ratio enforced frequency divided by resonance frequency showing operating points of the spring sections.

FIG. 6 is a section view of the vibration absorbing device.

FIG. 7 is a top view of the vibration absorbing device.

FIG. 8 is a top view of a twin-driver means arrangement.

DESCRIPTION OF THE PREFERRED EMBODIMENT

Referring now to FIGS. 1, 2 and 3, there is shown a vehicle which includes an upper dish-shaped housing 10 rigidly attached to a lower dish-shaped housing 12, having a flat bottom surface and a drive means 14 totally enclosed therein and rigidly attached to the floor of housing 12. It is to be understood that the structure is only described as dish-shaped in the present embodiment for convenience and could, of course, be any other structure such as in a toy which could be propelled in a horizontal direction.

The drive means 14 comprises a DC motor 16, with two unbalance weights 18a and 18b eccentrically mounted on both ends of its horizontal drive shaft 20 for symmetry. When drive shaft 20 rotates, weights 18a and 18b rotate in a vertical plane and due to their rotation, produce a centrifugal force 22 as shown in FIG. 4 also rotating in a vertical plane. The DC motor 16 is rigidly attached to the short section 24a of an L-shaped leaf spring 24 and is forward-downward inclined in direction 32a–32b, whereas the base of the long section 24b is rigidly attached to the floor of the vehicle structure in a forward-upward inclined direction 30a–30b.

Referring now to FIG. 4 section 24a and 24b of spring 24 are shown to be perpendicular to each other. As indicated in FIG. 4, force vector 22 roating at motor frequency, can be divided into two (also with motor frequency) oscillating force components, in this case in a force component 26 perpendicular to spring section 24a and a force component 28 perpendicular to spring section 24b. The force components acting upon the respective spring sections, tend to deflect them in a reciprocating motion at the oscilating frequency of the component which is also the motor frequency or the enforced vibration frequency. Thus, there is provided a vibrating system having two principal directions of vibration.

It is known that any spring has a characteristic resonance or sometimes called "critical frequency" at which it vibrates freely once such a vibration is excited. Thus, in the present invention, each spring section has its own particular resonance frequency. The short section 24a having a higher resonance frequency than the long section 24b. In the presently preferred embodiment of the invention, spring 24 is so designed that the enforced vibration frequency falls above the resonance frequency of the short spring section 24a and below the resonance frequency of the long spring section 24b.

With reference now to FIG. 5, there is shown in diagrammatic form the deflections of a spring as a function of the ratio of the enforced vibration frequency divided by the resonance frequency. It can be seen that as the ratio approaches unity the spring deflection increases to a maximum and as the ratio gets larger than unity, the deflection decreases towards a minimum which approaches zero. From FIG. 5 it can be determined that if the enforced frequency is below or close to resonance frequency, very large spring deflection results. Whereas, if the enforced frequency is above and far removed from resonance frequency, very small or nearly zero deflection occurs. Spring sections 24a and 24b are designed to operate at the points indicated in diagram 5 which are positioned relatively to resonance point of the spring sections. Since forces on the spring sections 24a and 24b and on the vehicle structure to which they are attached are proportional to the deflection of the respective spring section and its spring rate, almost no force from the vibration of spring section 24b is imposed upon the vehicle structure since deflection at the operating frequency of the motor is nearly zero. However, considerable force is imposed upon the vehicle structure by the vibration of spring section 24a, since as can be seen in FIG. 5, it has a relatively large deflection at the motor frequency utilized.

The vertically pulsating force in direction 30a produced by spring member 24a, is the propulsive force that eventually drives the vehicle in such a manner that when the force is in direction 30b downwardly, the vehicle is not propelled and stands still and will not slip due to frictional forces between the sliding surfaces. The energy used to deflect spring section 24a downwardly is stored in the spring itself when the spring deflects in direction 30b. However, when the spring deflects in direction 30a upwardly, the stored energy will be released and will lift the vehicle, making frictional forces between the sliding surfaces smaller and at the same time will push the vehicle in a forward direction 32 in FIG. 3. This "sit and store" and "lift and push" action is repeated with every revolution of the DC motor 16, and because the motor 16 has a high rotational speed, this action becomes continuous and is translated in the vehicle into a continuous forward movement.

To optimize or better tune the spring system for maximum propulsive force, direction 30a and 30b of spring section 24a and direction of deflection 28 of spring section 24b can be adjusted by appropriate bending of the spring 24 so that the angle α between members 24a and 24b is changed appropriately.

The direction of rotation of the DC motor 16 has no effect as to the direction of the propulsive action which is of advantage because when the drive means 14 is attached to housing 12, the direction of movement is determined. Also, as the rotational speed of the motor changes, the magnitude of centrifugal force 26 changes proportionately. Thus, the propulsive force in turn changes proportionately with motor speed and so makes it possible to change the velocity of the forward movement of the vehicle by changing the rotational speed of the DC motor 16.

With reference again to FIG. 2, the DC motor 16 is connected by suitable conductor wires 34 to plugs 36 mounted at the back of housing 12. Wires can then be connected from the plugs 36 in a conventional manner to a battery holder containing a plurality of dry cell batteries and having switching means and/or a rheostat to regulate motor speed.

Housing 10 and 12 are made of any light weight material that can be easily molded. Some materials that can be used are papier-mache, cardboard and plastics such as styrene or acrylics.

Leaf spring 24 can be made of any resilient material including plastics that have enough spring and memory and fatigue strength to function for extended periods of time without damage.

In FIGS. 6 and 7 there is shown a vibration absorbing device attached to the bottom of housing 12. The vibration absorbing device comprises a dish-shaped member 38 imposed upon the bottom housing 12 of the vehicle. An air gap is defined between the bottom housing 12 and dish-shaped member 38, and is hermetically sealed by a flexible bellow 40 attached circumferentially from the outer edge of member 38 to housing 12. Vent holes 44 are provided from the enclosed air space through housing 12. Any excess vibration in the vehicle structure causes housing 12 to vibrate up and down relative to member 38 and in so doing air is vented and taken in through vent holes 44. This air venting action absorbs the excess vibrational energy and smoothens out the movement of the vehicle moving on a hard surface. In the presently preferred embodiment of the invention, three spring members 42 are inserted between member 38 and housing 12, the springs being so situated as to equally absorb the vibrational forces emanating from housing 12. It is also within the scope of the present invention to use resilient pads instead of springs to absorb the excess vibrations.

In an alternate embodiment of the invention as shown in FIG. 8, an arrangement is provided having two drive means 14 mounted side by side and spaced apart as far as possible within the vehicle structure without obstructing the rotation of the unbalance weight on the floor of housing 12. By reducing the rotational speed of one motor, the propulsive force of the respective drive means is also reduced and the difference between the propulsive forces of the two drive means 14 causes the vehicle to change direction or to turn. To cause one motor to slow down and the other to speed up can be accomplished by connecting a conventional power balance into the electrical circuitry.

Although the vehicle as described has its power source outside the vehicle structure with the drive means mounted on the floor of the housing 12, it is within the scope of the invention to provide a power source within the vehicle structure and to mount the drive means 14 upside down to the upper portion 10 of the housing.

In operation power is applied to electric motor 14 causing weights 18a and 18b to rotate upon shaft 20 at a predetermined frequency. The rotational imbalance produces forces in the direction 22. Combined spring elements 24a and 24b are caused to vibrate by the rotation of weights 18a and 18b and the combined springs are designed so that the force vector in direction 22 is transformed to a force in the horizontal direction 32, as has been previously explained, thus causing the toy to move along in the direction 32 with a smooth motion upon any surface. The velocity of the vehicle can be controlled by increasing or decreasing the rotational speed of the electric motor. In the alternate embodiment of the invention as described, direction changes can be made by increasing or decreasing the rotational speed of one electric motor relative to the rotational speed of the other motor.

The direction of movement of the vehicle can also be controlled by slightly pulling wires connected to the vehicle at one end and connected to a battery holder, which is preferably of the handle type design at the other end. The wires are pulled to the left if a change in direction the right is desired, and by pulling the wires slightly to the right if a change of direction to the left is required.

It is apparent from the foregoing, that there is provided a vehicle which moves easily and evenly on soft surfaces such as carpets, rugs, sand, lawn, etc., and which, due to the vibration absorbing device incorporated therein, can also move smoothly upon hard surfaces. The unique structure provided, such as in a toy, can move along a surface in the horizontal plane by transforming a vibrating impulse from the vertical direction to the horizontal direction. This device in contrast to prior art devices, does not require the application of mechanical energy and the storing of that energy in a spring which upon being actuated is released, thus propelling the vehicle in the opposing direction. The invented device is operated by a DC electric motor to which power can be supplied either exteriorly or by storage batteries within the structure. The device is novel in that when used as a toy it gives the impression that it is able to move along a flat surface without the application of any visible means of propulsion, such as wheels.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. A vehicle comprising:
a housing having a bottom surface;
drive means mounted within said housing, said drive means consisting of spring means, said spring means having at least two sections each having different resonance frequencies;
motor means horizontally mounted on one section of said spring means, said motor having unbalance weights eccentrically mounted on both ends of its shaft and being adapted to produce rotating centrifugal forces;
said spring means being adapted to vibrate and to transform said rotating centrifugal forces into a propulsive force, thereby causing said housing to move on said bottom surface in the direction of said propulsive force.

2. The structure as defined in claim 1 wherein said spring means comprises an L-shaped member which is attached to the floor of said housing, one leg of L-shaped member being adapted to operate below its resonance frequency, the other leg of said L-shaped member being adapted to operate above its resonance frequency.

3. The structure as defined in claim 2 wherein said motor means is an electric DC motor mounted within said housing.

4. The structure as defined in claim 2 wherein said spring means is caused to vibrate by said rotational unbalance force, said spring means being adapted to transform said rotating unbalance force into a propulsive force, thereby moving said housing in the direction of said propulsive force.

5. The structure as defined in claim 4 wherein said housing is generally dish-shaped and is made of a light weight moldable material.

6. A vibration impulse driven vehicle comprising:
a housing, said housing having a first generally dish-shaped lower section;
a second generally dish-shaped lower member imposed upon the first generally dish-shaped lower member to define an air space there-between;
spring means mounted on the floor of said first generally dish-shaped member, said spring means having at least two sections which have different resonance energies;
an electric motor mounted on one section of said spring means, said electric motor being adapted to rotate eccentrically and to produce a rotational unbalance force, said rotational unbalance force producing a resultant centrifugal force in a first direction; and said spring means being adapted to vibrate and to transform the centrifugal force from said first direction into a second horizontal direction, thereby causing said dish-shaped structure to move in said second horizontal direction.

7. The structure as defined in claim 6 wherein a power source for said electric motor is located exteriorly of said housing.

8. The structure as defined in claim 6 wherein the power source for said electric motor is located within said dish-shaped structure.

9. The structure as defined in claim 6 wherein said spring means are mounted in an inverted position upon the inside surface of said top section of said housing.

10. A vehicle comprising:
a housing having a bottom section;
at least two drive means mounted within said housing, said drive means being generally in the same horizontal plane and being spaced apart, said drive means comprising spring means which each have at least two sections which have different resonance frequencies;
motor means horizontally mounted on each of one section of each of said spring means, said motor means having unbalance weights eccentrically mounted on both ends and being adapted to produce rotating centrifugal forces, said spring means being adapted to vibrate and to transform said rotating centrifugal forces into a propulsive force thereby causing said housing to move on said bottom surface in the direction of said propulsive force; and
said two drive means being adapted to operate independently and to provide propulsive forces of variable magnitude.

11. The structure as defined in claim 10 wherein control means are provided exteriorly of said housing to regulate the propulsive forces of said drive means.

12. The structure as defined in claim 6 where control means are provided exteriorly of said housing to control the magnitude of said propulsive force and to provide means for changing direction of vehicle.

13. The structure as defined in claim 2 wherein an angle $\alpha$ between the lengths of the L-shaped spring member can be varied to provide a desired direction to the propulsive force.

14. The structure as defined in claim 13 wherein the sections of said spring means can be provided with predetermined resonance frequencies which will operate at the desired frequencies in response to the vibrational frequency of a rotating unbalance force.

15. The structure as defined in claim 14 wherein said spring means having at least two sections is an integral member.

16. The structure as defined in claim 14 wherein the sections of said spring means are joined by appropriate joining methods.

17. The structure as defined in claim 6 wherein a plurality of venting holes are provided from said housing through said first generally dish-shaped lower member into the air space defined by said second dish-shaped lower member.

References Cited

UNITED STATES PATENTS

| | | | |
|---|---|---|---|
| 3,196,580 | 7/1965 | Rakestraw | 46—243 |
| 3,425,689 | 2/1969 | Convertine | 46—243 X |

FOREIGN PATENTS

| | | |
|---|---|---|
| 1,145,160 | 5/1967 | France. |

LOUIS G. MANCENE, Primary Examiner

R. F. CUTTING, Assistant Examiner

U.S. Cl. X.R.

46—207